Nov. 28, 1939.　　　　　G. MEYER　　　　　2,181,460
CHANGE-SPEED GEAR
Filed Aug. 25, 1936
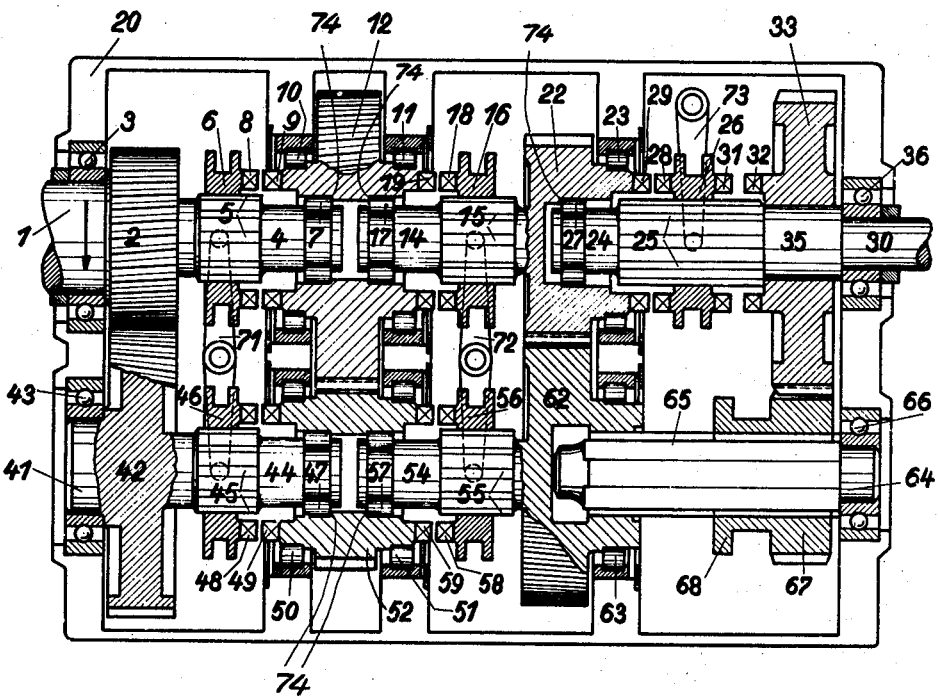
Inventor: Gustav Meyer Patented Nov. 28, 1939

2,181,460

UNITED STATES PATENT OFFICE 2,181,460

CHANGE-SPEED GEAR

Gustav Meyer, Friedrichshafen on the Bodensee, Germany, assignor to Maybach Motorenbau Gesellschaft mit beschränkter Haftung, Friedrichshafen on the Bodensee, Germany, a corporation of Germany Application August 25, 1936, Serial No. 97,838
In Germany June 6, 1936

12 Claims. (Cl. 74—359)

The invention relates to a gear-wheel change-speed gear, more particularly for motor vehicles, comprising gear wheels mounted on the parts of a sectional mainshaft and meshing with gear wheels mounted on the parts of a complementary sectional layshaft, the various shaft parts being adapted to be coupled together by gear-changing clutches according to the desired transmission, and some or all of the gear-wheels having teeth directed obliquely to their axis. According to the invention, some or all of the gear-wheels are in rigid connection with their supporting shaft part and journalled on one side in a bearing mounted in the casing and on the other side only in a bearing carried by the part of the sectional shaft adjacent to the part on which it is mounted. By mounting the gear wheel near the bearing mounted in the casing the principal radial bearing pressure is always taken up by this bearing and only a relatively small portion is taken up by the bearing carried by the adjacent shaft part.

As compared with the constructions known heretofore, the aforesaid construction results in a valuable reduction in the overall length of the gear, since in the known constructions each gear-wheel is usually journalled twice. As compared with such gears, fewer bearings with large dimensions are also required. It is true that such gears having a relatively short overall length are known, wherein one or more pairs of gear-wheels are journalled in bearings mounted in the other rotating parts. As compared with these constructions, the arrangement according to the invention is substantially more stable and hence the gear runs more smoothly and silently and the wear is less.

In order to reduce the load on the intermediate bearings and to shorten, lighten and cheapen the gear still further, the gear-wheel bearings carried by the shaft parts are so constructed that the axial thrusts are transmitted by them. The said axial thrusts may furthermore be transmitted to certain bearings which are constructed of particularly large dimensions for the purpose, for example, said thrusts are preferably transmitted to the end bearings of the sectional mainshaft or layshaft. The end bearings may easily be made of sufficiently large dimensions for this purpose, while there are limits to the dimensions of the intermediate bearings. For the same purpose, the intermediate bearings mounted in the casing and in which the gear-wheels are journalled, are in addition so constructed that these bearings only transmit radial pressures and are therefore not subjected to axial thrusts.

By reducing the load on the intermediate bearings mounted in the casing, the said bearings may also be made of lighter construction and are correspondingly preserved. This again results in an exceedingly noiseless running of the gear and easy gear-shifting. Furthermore, the gear-wheels do not tend to jump out of engagement as is readily the case when multiple bearings are used. The bearings carried by the sectional shaft parts may be made of particularly small dimensions in gears according to the invention.

In addition, in gears according to the invention, matters may advantageously be so arranged that the parts of the bearings carried by the sectional shaft parts are connected together (i. e., made stationary relatively to one another) by the adjacent gear-changing clutch in cases where, in consequence of the obliquity of the teeth, these bearings have to transmit an axial thrust resulting from the driving torque. This results in less wear of the bearings.

Apart from the gear-wheels with obliquely directed teeth which are preferably employed, wheels with straight teeth may also be provided in gears according to the invention (particularly for example for the infrequently used speeds and the reverse).

Particular advantages are afforded by making the direction of the obliquities of the teeth of the obliquely toothed gear-wheels, which are journalled on one side in a bearing mounted directly in the casing and on the other side in a bearing carried by the adjacent shaft part, opposite to the direction of rotation of the corresponding shaft seen from the driving side, since the axial thrusts can then conveniently be arranged to pass through the bearings carried by the shaft parts only when the parts of the said bearings are stationary relatively to one another owing to the engagement of the adjacent dog clutch.

A constructional example of a change-speed gear according to the invention is shown diagrammatically largely in section in the single figure in the accompanying drawing.

In the change-speed gear shown in the figure the sectional mainshaft is composed of the following parts shaft 4, hub of the gear wheel 12, shaft 14, and shaft 25, and the sectional layshaft is composed of the parts shaft 44, hub of the gear-wheel 52, and shaft 54, 65.

The shaft 4 is an extension of the shaft 1 to which the power of the engine is applied and is carried at one end in a thrust-absorbing bearing 3 and at the other end in a roller bearing 7 running in a recess in the hub of the gear-wheel 12. One end of the shaft 14 is similarly carried in a roller bearing 17 running in a recess in the hub of the gear wheel 12, and the other end is provided with a recess in which runs a roller bearing 27 supporting one end of the shaft 25. The other end of the shaft 25 is carried in a thrust-absorbing bearing 36.

Of the sectional layshaft the shaft 44 is carried at one end in a thrust-absorbing bearing 43 and at the other end in a roller bearing 47 running in a recess in the hub of the gear wheel 52. One end of the shaft 54, 65 is similarly carried in a roller bearing 57 running in a recess in the hub of the gear wheel 52, and the other end is carried in a thrust-absorbing bearing 66. The roller bearings 7, 17, 23, 47 and 57 are formed with only one shoulder 74 on their recesses, so that they can only transmit axial thrust corresponding to compression of the shaft parts.

Dog clutches 6, 16, 26, 46 and 56 are provided for coupling together the parts of the sectional mainshaft and layshaft.

Obliquely toothed gear wheels 2 and 22 are mounted on the parts 4 and 14 of the sectional mainshaft and are in constant mesh with gear wheels 42 and 62 mounted on the parts 44 and 54 of the sectional layshaft. The gear wheels 12 and 52 also have oblique teeth and are in constant mesh with one another. A straight toothed spur wheel 33 is mounted on the shaft 25 and has dogs 32 adapted to engage with the dogs 31 provided on the dog clutch 26. On the layshaft part 65 there is also mounted a sliding spur wheel 67 adapted to be brought into mesh with the gear wheel 33. The radial forces of the gear wheels 12, 52, 22 and 62 are taken by roller bearings 10, 11, 50, 51, 23 and 63 mounted in the casing.

The directions of the teeth of the gear wheels 12, 52, 22 and 62 are chosen such that the axial thrusts produced by the transmission of the power of the driving engine are transmitted by bearings 7, 17, 27, 47 or 57 which are locked by the engagement of the adjacent dog clutch 6, 16, 26, 46 or 56 while the thrust is acting on them. That is to say, for clockwise rotation of the driving shaft 1 the teeth of the wheels 12 and 22 are left-hand helices, and the teeth of the wheels 52 and 62 are (necessarily) right-hand helices.

At 71 is a double lever, by means whereof the clutch sleeves 6 and 46 can be moved simultaneously. If the clutch 8, 9 is brought out of engagement, the clutch 48, 49 is moved into engagement and conversely. In the same way, the clutches 18, 19 and 58, 59 are operated simultaneously by means of the double lever 72. At 73 is the operating lever for the clutch sleeve 26.

In known manner, eight forward speeds may be obtained with the gear, of which the following will chiefly be used:

1st speed.—Gear-wheels 2, 42, shaft element 44, clutch 48, 49, gear-wheels 52, 12, clutch 19, 18, shaft element 14, gear-wheels 22, 62, shaft element 64, gear-wheels 67, 33, clutch 32, 31, shaft element 24, 35, driven shaft 30.

2nd speed.—Gear-wheels 2, 42, shaft element 44 or 48, 49, gear-wheel 52, clutch 59, 58, shaft element 54, gear-wheel 62, shaft element 64, gear-wheels 67, 33, clutch 32, 31, shaft element 24, 35, driven shaft 30.

3rd speed.—Gear-wheels 2, 42, shaft element 44, clutch 48, 49, gear-wheels 52, 12, clutch 19, 18, shaft element 14, gear-wheel 22, clutch 29, 28, shaft element 24, 35, driven shaft 30.

4th speed.—Gear-wheels 2, 42, shaft element 44, clutch 48, 49, gear-wheel 52, clutch 59, 58, shaft element 54, gear-wheels 62, 22, clutch 29, 28, shaft element 24, 35, driven shaft 30.

5th speed.—From the driven shaft 1 through the shaft element 4, clutch 8, 9, gear-wheel 12, clutch 19, 18, shaft element 14, gear-wheel 22, clutch 29, 28, shaft element 24, 35, driven shaft 30.

6th speed.—From the driven shaft 1 through the shaft element 4, clutch 8, 9, gear-wheels 12, 22, clutch 59, 58, shaft element 54, gear-wheels 62, 22, clutch 29, 28, shaft element 24, 35, driven shaft 30.

The radial bearing pressures of the gear-wheel 2 are taken up for the greater part in the ball bearing 3, which being an outer bearing of the gear can be made without difficulty of sufficiently large dimensions for that purpose. Only a small portion of these bearing pressures are taken up by the roller bearing 7, which is mounted in the hub bore of the gear-wheel 12, the division of the pressures being inversely proportional to the distances of the bearings 3 and 7 from the gear-wheel 2. In the same way, the bearing pressures of the gear-wheel 42 are taken up partly by the outer bearing 43 and to a small extent by the roller bearing 47 mounted in the hub bore of the gear-wheel 52. The gear-wheels 22 and 62 are also mounted in roller bearings 23 and 63 situated immediately near the said gear-wheels, so that these roller bearings take up the principal radial pressures, while the roller bearings 17 and 57 mounted in the hub bores of the gear-wheels 12 and 52 have to transmit only a small part of the residual radial bearing pressures of these gear-wheels. The gear-wheels 12 and 52 are mounted in sufficiently large roller bearings 10 and 11, by means of which the radial pressures transmitted by the bearings 7, 17, 27, 57 are also taken up.

In the speeds in which the gear-wheels 2 and 42 transmit the driving torque, the axial thrusts of the gear-wheel 2 are transmitted to the outer bearing 3, those of the gear-wheel 42 are transmitted by the shaft element 44 to the bearing 47 and, if the clutch 59, 58 is in engagement, by the bearing 57, the shaft element 54, the hub of the wheel 62 and the shaft element 64 to the end bearing 66. If the clutch 59, 58 is not in engagement, that is to say, if the driving power is transmitted from the gear-wheel 52 to the gear-wheel 12, the axial thrust of the gear-wheel 42 acts against that of the gear-wheel 52. Since the latter is greater, a resultant axial thrust is produced on the bearing 43.

In the speeds in which the driving torque is transmitted from the gear-wheel 52 to the gear-wheel 12, the axial thrust of the gear-wheel 12 is transmitted by the bearing 17, shaft element 14, hub of the gear-wheel 22, bearing 27, shaft element 24, 35 to the end bearing 36. If the driving torque is transmitted from the gear-wheel 12 to the gear-wheel 52, the axial thrusts are transmitted from the gear-wheel 12 by the bearing 7, shaft element 4 and gear-wheel 2 to the end bearing 3, and the axial thrust of the gear-wheel 52 is transmitted by the bearing 57, shaft element 54, hub of the gear-wheel 62, shaft element 64 to the end bearing 66.

In speeds in which the driving torque is transmitted from the gear-wheel 22 to the gear-wheel 62, the axial thrust of the gear-wheel 22 is transmitted by the shaft element 14, bearing 17, hub of the gear-wheel 12, bearing 7, shaft element 4 and gear-wheel 2 to the end bearing 3. The axial thrust of the gear-wheel 62 is transmitted by the shaft element 64 to the end bearing 66.

In speeds in which the driving torque is transmitted from the gear-wheel 62 to the gear-wheel 22, the axial thrust of the gear-wheel 62 is transmitted by the shaft element 54, bearing 57, hub of the gear-wheel 52, bearing 47, shaft element 44 and gear-wheel 42 to the end bearing 43. The axial thrust of the gear-wheel 22 is transmitted by the bearing 27, and shaft element 24, 35 to the end bearing 36.

In the case of the bearings (7, 17, 27, 47, and 57) carried by shaft parts, if axial thrust is transmitted by the said bearings, the adjacent clutches (8, 9; 18,19; 28, 29; 48, 49; 58, 59) are in engagement in each case, as follows from the foregoing. In this case, therefore, the roller bearings do not move relatively to their track surfaces. The bearings mounted in the interior of the gear in the gear casing itself (10, 11, 23; 50, 51, 63) are so constructed that no axial thrusts are taken up by these bearings, but these thrusts are transmitted to the end bearings (3, 36; 43, 66) by the bearings mounted carried by shaft parts.

After closing the throttle, that is to say when the gear is driven by the road wheels of the vehicle, the direction of the axial thrusts in the various speeds is reversed. In this case, the axial thrusts are taken up partly by bearings which are in motion. Since, however, the power transmitted in this case is substantially smaller, the wear of the bearings concerned is only slight.

No axial thrusts are transmitted to the roller bearings 10, 11, 23, 50, 51 and 63, since the said axial thrusts are transmitted by the bearings 7, 17, 27, 47, and 57 to the end bearings 3, 36, 43 and 66. The outer races of the bearings 10, 11, 23, 50, 51 and 63 are laterally slidable.

If the gear-wheel 67 is brought out of engagement with the gear-wheel 33, a reverse can be obtained off the gear-wheel 67 through an intermediate gear-wheel of known kind, it being possible to use various transmissions to be adjusted by means of the gear-wheels situated in front of the pair of gear-wheels 67, 33.

I claim:

1. In a change-speed gear comprising gear-wheels mounted on the parts of a sectional main-shaft and meshing with gear-wheels mounted on the parts of a complementary sectional layshaft, a gear-wheel in rigid connection with its supporting shaft part and journalled on one side in a bearing mounted in the casing and on the other side only in a bearing carried by the part of the sectional shaft adjacent to the part on which it is mounted.

2. In a change-speed gear comprising gear-wheels mounted on the parts of a sectional main-shaft and meshing with gear-wheels mounted on the parts of a complementary sectional layshaft, a shaft part having a gear-wheel rigidly mounted thereon near one end, said shaft part being journalled exclusively in bearings arranged at its ends, the bearing at the gear-wheel end being mounted in the casing and the bearing at the other end being carried by the adjacent part of the sectional shaft.

3. In a change-speed gear comprising gear-wheels mounted on the parts of a sectional main-shaft and meshing with gear wheels mounted on the parts of a complementary sectional layshaft, a gear-wheel in rigid conection with its supporting shaft part and journalled on one side in a bearing mounted in the casing and on the other side only in a bearing carried by a shaft part supported at both ends in bearings mounted in the casing.

4. In a change-speed gear comprising gear-wheels mounted on the parts of a sectional main-shaft and meshing with gear wheels mounted on the parts of a complementary sectional layshaft, a shaft part having a gear-wheel rigidly mounted thereon near one end, said shaft part being journalled exclusively in bearings arranged at its ends, the bearing at the gear-wheel end being mounted in the casing and the bearing at the other end being carried by a shaft part supported at both ends in bearings mounted in the casing.

5. In a change-speed gear comprising gear-wheels mounted on the parts of a sectional main-shaft and meshing with gear wheels mounted on the parts of a complementary sectional layshaft, a gear-wheel in rigid connection with its supporting shaft part and journalled on one side in a bearing mounted in the casing and on the other side only in a bearing carried by the adjacent part of the sectional shaft, said last-mentioned bearing being arranged to transmit axial and radial pressures.

6. In a change-speed gear comprising gear-wheels mounted on the parts of a sectional main-shaft and meshing with gear wheels mounted on the parts of a complementary sectional layshaft, a shaft part having a gear-wheel rigidly mounted thereon near one end, said shaft part being journalled exclusively in bearing arranged at its ends, the bearing at the gear-wheel end being mounted in the casing and the bearing at the other end being carried by the adjacent part of the sectional shaft, said last-mentioned bearing being arranged to transmit axial and radial pressures.

7. In a change-speed gear, a pair of obliquely toothed gear wheels in constant mesh, one of said wheels being rigidly mounted on a shaft part supported on one side of said gear wheels by a bearing mounted directly in the casing and on the other side only by an antifriction bearing carried by an adjacent shaft part and capable of transmitting axial thrust in one direction only, and a dog clutch for coupling together said shaft parts, the teeth of said gear wheels being so directed that when said shaft parts are so coupled and power is being transmitted through the change speed gear in the normal direction, any axial thrust from the gear wheel mounted on the shaft part partly supported by said antifriction bearing acts in the same direction as that in which said antifriction bearing is capable of transmitting thrust to said adjacent shaft part.

8. In a change-speed gear, a pair of obliquely toothed gear wheels in constant mesh, one of said gear wheels being rigidly mounted on a shaft part supported on one side of said gear wheel and close thereto by a bearing mounted directly in the casing and on the other side only by an antifriction bearing carried at a distance from said rigidly mounted gear wheel by an adjacent shaft part and capable of transmitting axial thrusts in one direction only, and a dog clutch for coupling together said shaft parts, the teeth of said gear wheels being so directed that when said shaft parts are so coupled and power is being transmitted through the change speed gear in the normal direction, any axial thrust from the gear wheel mounted on the shaft part partly supported by said antifriction bearing acts in the same direction as that in which said antifriction bearing is capable of transmitting thrust to said adjacent shaft part.

9. In a change-speed gear, a pair of obliquely toothed gear wheels in constant mesh, one of said gear wheels being rigidly mounted on a shaft part journalled on one side of said gear wheel and close thereto in a bearing mounted directly in the casing and on the other side only in an antifriction bearing carried at a distance from said rigidly mounted gear wheel in a recess in an adjacent shaft part and capable of transmitting axial thrusts in one direction only, and a dog clutch for coupling together said shaft parts, the teeth of said gear wheels being so directed that when said shaft parts are so coupled and power is being transmitted through the change speed gear in the normal direction, any axial thrust from the gear wheel mounted on the shaft part partly supported by said antifriction bearing acts in the same direction as that in which said antifriction bearing is capable of transmitting thrust to said adjacent shaft part.

10. In a change-speed gear, a pair of obliquely toothed gear wheels in constant mesh, one of said gear wheels being rigidly mounted on an intermediate shaft part recessed at one end to receive the end of one of the adjacent shaft parts and projecting at its other end into a recess in the other adjacent shaft part and additionally supported only by a bearing mounted directly in the casing close to one side of said rigidly mounted gear wheel, antifriction bearings between said shaft parts capable of transmitting axial thrusts in one direction only, and dog clutches for coupling together said shaft parts, the teeth of said gear wheels being so directed that when two of said shaft parts are coupled by the engagement of the dog clutch between them and power is being transmitted through the change speed gear in the normal direction, any axial thrust from the gear wheel mounted on said intermediate shaft part acts in the same direction as that in which the antifriction bearing between the coupled shaft parts is capable of transmitting thrust from said intermediate shaft part to the adjacent shaft part.

11. In a change-speed gear, a sectional mainshaft, a sectional layshaft, antifriction bearings between the parts of said shafts capable of transmitting axial thrusts in one direction only, a thrust absorbing bearing at each end of each shaft, dog clutches for coupling together the parts of said shafts, a pair of obliquely toothed gear wheels in constant mesh, one of said wheels being rigidly mounted on an intermediate part of one of said shafts and the other on a part of the other shaft, and a bearing mounted directly in the casing and forming the only additional support for said intermediate shaft part other than one of the antifriction bearings between it and one of the adjacent shaft parts, the teeth of said gear wheels being so directed that when said intermediate shaft part is coupled to one of the adjacent shaft parts by the engagement of the dog clutch between them and power is being transmitted through the change speed gear in the normal direction, any axial thrust from the gear wheel mounted on said intermediate shaft part acts in the same direction as that in which the antifriction bearing between the coupled shaft parts is capable of transmitting thrust to the adjacent shaft part.

12. In a change-speed gear, a sectional mainshaft, a sectional layshaft, antifriction bearings between the parts of said shafts capable of transmitting axial thrusts in one direction only, a thrust absorbing bearing at each end of each shaft, dog clutches for coupling together the parts of said shafts, a pair of obliquely toothed gear wheels in constant mesh, one of said wheels being rigidly mounted on an intermediate part of one of said shafts near one end thereof and the other on a part of the other shaft, and a bearing mounted directly in the casing and supporting said intermediate shaft part at the gear wheel end thereof, said intermediate shaft part being otherwise supported only by the antifriction bearing between it and the adjacent shaft part at the end remote from said rigidly mounted gear wheel, the teeth of said gear wheels being so directed that when said intermediate shaft part is coupled to one of the adjacent shaft parts by the engagement of the dog clutch between them and power is being transmitted through the change speed gear in the normal direction, any axial thrust from the gear wheel mounted on said intermediate shaft part acts in the same direction as that in which the antifriction bearing between the coupled shaft parts is capable of transmitting thrust to the adjacent shaft part.

GUSTAV MEYER.